(12) United States Patent
Cho et al.

(10) Patent No.: US 8,584,206 B2
(45) Date of Patent: Nov. 12, 2013

(54) METHOD FOR MANAGING DOMAIN USING MULTI DOMAIN MANAGER AND DOMAIN SYSTEM

(75) Inventors: Sung-hyun Cho, Seoul (KR); Min-gyu Chung, Seoul (KR); Koo-yong Pak, Seoul (KR); Il Gon Park, Seoul (KR); Soo Jung Kim, Seoul (KR); Man Soo Jeong, Seoul (KR)

(73) Assignee: LG Electronics Inc., Seoul (KR)

(*) Notice: Subject to any disclaimer, the term of this patent is extended or adjusted under 35 U.S.C. 154(b) by 210 days.

(21) Appl. No.: 12/298,914

(22) PCT Filed: Feb. 18, 2008

(86) PCT No.: PCT/KR2008/000944
§ 371 (c)(1),
(2), (4) Date: Oct. 29, 2008

(87) PCT Pub. No.: WO03/058620
PCT Pub. Date: Jul. 17, 2003

(65) Prior Publication Data
US 2009/0300724 A1 Dec. 3, 2009

Related U.S. Application Data

(60) Provisional application No. 60/890,269, filed on Feb. 16, 2007, provisional application No. 60/890,959, filed on Feb. 21, 2007.

(51) Int. Cl.
*G06F 7/04* (2006.01)
*G06F 21/00* (2013.01)
(52) U.S. Cl.
USPC .............................................. 726/4; 713/182

(58) Field of Classification Search
USPC .............................................. 726/4; 713/182
See application file for complete search history.

(56) References Cited

U.S. PATENT DOCUMENTS

| 5,708,812 A | 1/1998 | Van et al. |
| 5,774,668 A | 6/1998 | Choquier et al. |
| 5,862,348 A | 1/1999 | Pedersen |

(Continued)

FOREIGN PATENT DOCUMENTS

| CN | 1405690 A | 3/2003 |
| CN | 1469583 | 1/2004 |

(Continued)

OTHER PUBLICATIONS

Final Office Action dated Feb. 4, 2011 for U.S. Appl. No. 12/281,640, 8 pages.

(Continued)

*Primary Examiner* — Taghi Arani
*Assistant Examiner* — Syed Zaidi
(74) *Attorney, Agent, or Firm* — Fish & Richardson P.C.

(57) ABSTRACT

The present invention relates to a method of managing a domain employing a multi-domain manager and a domain system. The method of managing a domain employing a multi-domain manager includes designating a primary domain manager, configuring the domain by registering a domain device with the primary domain manager, designating at least one secondary domain manager of the domain devices, and managing the domain through conjunction of the primary domain manager and the secondary domain manager. Thus, domain management can be performed efficiently by employing a multi-domain manager.

10 Claims, 8 Drawing Sheets

(56) References Cited

U.S. PATENT DOCUMENTS

| | | | |
|---|---|---|---|
| 5,903,566 A | 5/1999 | Flammer, III | |
| 5,991,876 A | 11/1999 | Johnson et al. | |
| 6,006,332 A | 12/1999 | Rabne et al. | |
| 6,044,075 A | 3/2000 | Le Boudec et al. | |
| 6,167,405 A | 12/2000 | Rosensteel et al. | |
| 6,226,618 B1 | 5/2001 | Downs et al. | |
| 6,230,281 B1* | 5/2001 | Brodfuhrer et al. | 714/4.21 |
| 6,363,416 B1 | 3/2002 | Naeimi et al. | |
| 6,460,058 B2 | 10/2002 | Koppolu et al. | |
| 6,466,971 B1 | 10/2002 | Humpleman et al. | |
| 6,484,221 B1 | 11/2002 | Lorinser et al. | |
| 6,516,416 B2 | 2/2003 | Gregg et al. | |
| 6,519,656 B2 | 2/2003 | Kondo et al. | |
| 6,549,937 B1 | 4/2003 | Auerbach et al. | |
| 6,600,958 B1 | 7/2003 | Zondag | |
| 6,665,521 B1 | 12/2003 | Gorday et al. | |
| 6,678,791 B1 | 1/2004 | Jacobs et al. | |
| 6,807,542 B2 | 10/2004 | Bantz et al. | |
| 6,807,581 B1 | 10/2004 | Starr et al. | |
| 6,873,975 B1 | 3/2005 | Hatakeyama et al. | |
| 6,944,131 B2 | 9/2005 | Beshai et al. | |
| 6,954,436 B1 | 10/2005 | Yip et al. | |
| 6,993,587 B1 | 1/2006 | Basani et al. | |
| 7,016,963 B1 | 3/2006 | Judd et al. | |
| 7,020,781 B1 | 3/2006 | Saw et al. | |
| 7,032,003 B1 | 4/2006 | Shi et al. | |
| 7,036,011 B2 | 4/2006 | Grimes et al. | |
| 7,062,541 B1 | 6/2006 | Cannon et al. | |
| 7,076,541 B1 | 7/2006 | Burstein et al. | |
| 7,076,568 B2 | 7/2006 | Phillbrick et al. | |
| 7,100,070 B2 | 8/2006 | Iwamura et al. | |
| 7,184,988 B1 | 2/2007 | Frankel et al. | |
| 7,185,113 B1 | 2/2007 | Haberman et al. | |
| 7,213,269 B2 | 5/2007 | Orthlieb et al. | |
| 7,266,616 B1 | 9/2007 | Munshi et al. | |
| 7,421,578 B1 | 9/2008 | Huang et al. | |
| 7,461,130 B1 | 12/2008 | AbdelAziz et al. | |
| 7,484,058 B2 | 1/2009 | Frey et al. | |
| 7,512,973 B1 | 3/2009 | Chan et al. | |
| 7,546,641 B2 | 6/2009 | Robert et al. | |
| 7,549,062 B2 | 6/2009 | Kouznetsov et al. | |
| 7,555,464 B2 | 6/2009 | Candelore | |
| 7,565,438 B1 | 7/2009 | Zhu | |
| 7,577,999 B2 | 8/2009 | Narin et al. | |
| 7,624,072 B2 | 11/2009 | Lipsky et al. | |
| 7,664,883 B2 | 2/2010 | Craft et al. | |
| 7,673,008 B2 | 3/2010 | Kojima | |
| 7,680,963 B2 | 3/2010 | Go et al. | |
| 7,720,767 B2 | 5/2010 | Ta et al. | |
| 7,721,111 B2 | 5/2010 | Hug et al. | |
| 7,757,299 B2 | 7/2010 | Robert et al. | |
| 7,845,014 B2 | 11/2010 | Siegel | |
| 7,877,598 B2 | 1/2011 | Schmidt et al. | |
| 2001/0007993 A1 | 7/2001 | Wu | |
| 2001/0027479 A1 | 10/2001 | Delaney et al. | |
| 2001/0052033 A1 | 12/2001 | Bermudez et al. | |
| 2002/0091850 A1 | 7/2002 | Perholtz et al. | |
| 2002/0108050 A1 | 8/2002 | Raley et al. | |
| 2002/0120577 A1 | 8/2002 | Hans et al. | |
| 2002/0143855 A1 | 10/2002 | Traversat et al. | |
| 2002/0144108 A1 | 10/2002 | Benantar | |
| 2002/0144119 A1 | 10/2002 | Benantar | |
| 2002/0157002 A1 | 10/2002 | Messerges et al. | |
| 2002/0184515 A1 | 12/2002 | Oho et al. | |
| 2002/0198845 A1 | 12/2002 | Lao et al. | |
| 2003/0041138 A1 | 2/2003 | Kampe | |
| 2003/0078891 A1 | 4/2003 | Capitant | |
| 2003/0095540 A1 | 5/2003 | Mulligan et al. | |
| 2003/0114163 A1 | 6/2003 | Bickle et al. | |
| 2003/0120840 A1 | 6/2003 | Isozu | |
| 2003/0126086 A1 | 7/2003 | Safadi | |
| 2003/0159037 A1 | 8/2003 | Taki | |
| 2003/0189947 A1 | 10/2003 | Beshai | |
| 2003/0221014 A1 | 11/2003 | Kosiba et al. | |
| 2004/0003269 A1 | 1/2004 | Waxman et al. | |
| 2004/0003270 A1 | 1/2004 | Bourne et al. | |
| 2004/0054912 A1 | 3/2004 | Adent | |
| 2004/0057448 A1 | 3/2004 | Nakamura | |
| 2004/0062246 A1 | 4/2004 | Boucher et al. | |
| 2004/0088541 A1 | 5/2004 | Messerges et al. | |
| 2004/0117660 A1 | 6/2004 | Karaoguz et al. | |
| 2004/0128345 A1 | 7/2004 | Robinson et al. | |
| 2004/0151130 A1 | 8/2004 | Beshai et al. | |
| 2004/0158712 A1 | 8/2004 | Lee et al. | |
| 2004/0158731 A1 | 8/2004 | Narin et al. | |
| 2004/0168077 A1 | 8/2004 | Waxman et al. | |
| 2004/0172533 A1 | 9/2004 | DeMello et al. | |
| 2004/0174817 A1 | 9/2004 | Jabri et al. | |
| 2004/0230982 A1 | 11/2004 | Wookey | |
| 2004/0236717 A1 | 11/2004 | Demartini et al. | |
| 2004/0248561 A1 | 12/2004 | Nykanen et al. | |
| 2004/0249943 A1 | 12/2004 | Punaganti et al. | |
| 2004/0254993 A1 | 12/2004 | Mamas | |
| 2004/0255114 A1 | 12/2004 | Lee | |
| 2005/0003806 A1 | 1/2005 | Bazin et al. | |
| 2005/0021556 A1 | 1/2005 | Noguchi et al. | |
| 2005/0022033 A1 | 1/2005 | Han | |
| 2005/0039034 A1 | 2/2005 | Doyle | |
| 2005/0044391 A1 | 2/2005 | Noguchi et al. | |
| 2005/0054447 A1 | 3/2005 | Hiroyama et al. | |
| 2005/0055418 A1 | 3/2005 | Blanc et al. | |
| 2005/0065891 A1 | 3/2005 | Lee et al. | |
| 2005/0091507 A1 | 4/2005 | Lee et al. | |
| 2005/0102513 A1 | 5/2005 | Alve | |
| 2005/0120246 A1 | 6/2005 | Jang | |
| 2005/0144468 A1 | 6/2005 | Northcutt et al. | |
| 2005/0172045 A1 | 8/2005 | Bermudez et al. | |
| 2005/0182727 A1* | 8/2005 | Robert et al. | 705/51 |
| 2005/0198359 A1 | 9/2005 | Basani et al. | |
| 2005/0201301 A1 | 9/2005 | Bridgelall | |
| 2005/0210261 A1* | 9/2005 | Kamperman et al. | 713/182 |
| 2005/0223415 A1 | 10/2005 | Oho et al. | |
| 2005/0228858 A1 | 10/2005 | Mizutani et al. | |
| 2005/0265555 A1 | 12/2005 | Pippuri | |
| 2005/0267845 A1 | 12/2005 | Oh et al. | |
| 2005/0268090 A1 | 12/2005 | Saw et al. | |
| 2005/0289076 A1 | 12/2005 | Lambert | |
| 2006/0013158 A1 | 1/2006 | Ahuja et al. | |
| 2006/0015502 A1* | 1/2006 | Szucs | 707/9 |
| 2006/0026691 A1 | 2/2006 | Kim et al. | |
| 2006/0047775 A1 | 3/2006 | Bruck et al. | |
| 2006/0080529 A1 | 4/2006 | Yoon et al. | |
| 2006/0133335 A1 | 6/2006 | Garcia-Martin | |
| 2006/0168451 A1 | 7/2006 | Ishibashi et al. | |
| 2006/0190403 A1 | 8/2006 | Lin et al. | |
| 2006/0190521 A1 | 8/2006 | Kojima | |
| 2006/0218419 A1 | 9/2006 | Iwamura et al. | |
| 2006/0272026 A1 | 11/2006 | Niwano et al. | |
| 2007/0027814 A1 | 2/2007 | Tuoriniemi | |
| 2007/0078777 A1 | 4/2007 | Demartini et al. | |
| 2007/0083610 A1 | 4/2007 | Treder et al. | |
| 2007/0093255 A1 | 4/2007 | Nurminen et al. | |
| 2007/0094145 A1 | 4/2007 | Ta et al. | |
| 2007/0100701 A1 | 5/2007 | Boccon-Gibod et al. | |
| 2007/0156603 A1 | 7/2007 | Yoon et al. | |
| 2007/0198656 A1 | 8/2007 | Mazzaferri et al. | |
| 2007/0208574 A1 | 9/2007 | Zheng et al. | |
| 2007/0220302 A1 | 9/2007 | Cline et al. | |
| 2007/0233891 A1 | 10/2007 | Luby et al. | |
| 2007/0242821 A1 | 10/2007 | Kim et al. | |
| 2007/0255659 A1 | 11/2007 | Yen et al. | |
| 2007/0266198 A1 | 11/2007 | Bousis | |
| 2007/0269044 A1 | 11/2007 | Bruestle | |
| 2008/0120362 A1 | 5/2008 | Kapoor et al. | |
| 2008/0137528 A1 | 6/2008 | O'Toole et al. | |
| 2008/0216177 A1 | 9/2008 | Yokosato et al. | |
| 2008/0229387 A1 | 9/2008 | Baks et al. | |
| 2008/0256368 A1 | 10/2008 | Ross et al. | |
| 2009/0190496 A1 | 7/2009 | Mohamed-Rasheed et al. | |
| 2009/0228988 A1 | 9/2009 | Jeong et al. | |
| 2009/0235330 A1* | 9/2009 | Byun et al. | 726/4 |
| 2009/0307387 A1 | 12/2009 | Jeong et al. | |
| 2010/0257370 A1 | 10/2010 | Yoon et al. | |

(56) References Cited

U.S. PATENT DOCUMENTS

FOREIGN PATENT DOCUMENTS

| | | |
|---|---|---|
| CN | 1610914 A | 4/2005 |
| EP | 1564621 A1 | 8/2005 |
| EP | 1748598 | 1/2007 |
| JP | 08-202568 | 8/1996 |
| JP | 09-149435 | 6/1997 |
| JP | 2000-276424 | 10/2000 |
| JP | 2001-117809 | 4/2001 |
| JP | 2002-152301 A | 5/2002 |
| JP | 2002-516652 | 6/2002 |
| JP | 2003-110556 | 4/2003 |
| JP | 2003-152820 | 5/2003 |
| JP | 2003-169091 | 6/2003 |
| JP | 2003-242124 | 8/2003 |
| JP | 2004-023327 | 1/2004 |
| JP | 2004-110816 | 4/2004 |
| JP | 2004-110817 | 4/2004 |
| JP | 2004-171544 | 6/2004 |
| JP | 2004-302817 | 12/2004 |
| JP | 2005-092872 | 4/2005 |
| JP | 2005-100030 | 4/2005 |
| JP | 2005-117631 | 4/2005 |
| JP | 2005-123686 | 5/2005 |
| JP | 2005-129058 | 5/2005 |
| JP | 2005-514716 | 5/2005 |
| JP | 2005-182145 | 7/2005 |
| JP | 2005-526330 | 9/2005 |
| JP | 2007-312328 | 11/2007 |
| KR | 2006011763 A | 2/2002 |
| KR | 2004034165 A | 4/2004 |
| KR | 10-2005-0039522 | 4/2005 |
| KR | 2005032856 A | 4/2005 |
| KR | 2005037483 A | 4/2005 |
| KR | 2005077881 A | 8/2005 |
| KR | 2005101940 A | 10/2005 |
| KR | 2005104182 A | 11/2005 |
| KR | 2005120579 A | 12/2005 |
| RU | 2260918 C2 | 9/2005 |
| RU | 2265961 C2 | 12/2005 |
| WO | WO0250787 A1 | 6/2002 |
| WO | WO03036441 A2 | 5/2003 |
| WO | WO03034313 A3 | 7/2003 |
| WO | WO03058620 A2 | 7/2003 |
| WO | WO03073760 A1 | 9/2003 |
| WO | WO03107602 A1 | 12/2003 |
| WO | WO2004102459 A1 | 11/2004 |
| WO | WO 2005/010763 | 3/2005 |
| WO | WO2005034424 A1 | 4/2005 |
| WO | WO 2005041001 A1 | 5/2005 |
| WO | WO2004059478 A3 | 8/2005 |
| WO | WO2004031950 A3 | 9/2005 |
| WO | 2005-101831 | 10/2005 |
| WO | WO 2005/101831 A2 | 10/2005 |
| WO | WO 2006/011768 A1 | 2/2006 |
| WO | WO2006011768 A1 | 2/2006 |
| WO | WO2006043784 A1 | 4/2006 |
| WO | 2006092840 | 9/2006 |

OTHER PUBLICATIONS

U.S. Office Action dated Feb. 3, 2011 for U.S. Appl. No. 12/281,648, 20 pages.
European Search Report dated Sep. 22, 2009 for Application No. 08704618.1, 5 pages.
Russian Office Action in Application No. 2008145043/09 dated Apr. 30, 2010, with English translation, 7 pages.
U.S. Non-final Office Action in U.S. Appl. No. 12/281,633 dated Jun. 29, 2010, 25 pages.
Korean Search Report and Written Opinion in Application No. PCT/KR2007/004317, dated Dec. 10, 2007, 6 pages.
U.S. Office Action dated Feb. 18, 2011 for U.S. Appl. No. 12/281,650, 12 pages.
U.S. Notice of Allowance dated Feb. 23, 2011 for U.S. Appl. No. 12/347,426, 9 pages.
Russian Office Action in Application No. 2008145043 dated Aug. 18, 2010, with English translation, 14 pages.
U.S. Non-final Office Action in U.S. Appl. No. 12/281,634 dated Sep. 20, 2010, 26 pages.
Japanese Office Action dated Feb. 22, 2011 with English Translation, 4 pages.
Suresh Singh et al.; Electing Leaders Based Upon Performance: the Delay Model; IEEE; 2001; p. 464-471.
U.S. Final Office Action dated Mar. 2, 2011 for U.S. Appl. No. 12/281,634, 12 pages.
U.S. Non-final Office Action in U.S. Appl. No. 12/347,426 dated Aug. 18, 2010, 21 pages.
U.S. Non Final Office Action issued in U.S. Appl. No. 12/346,487, dated Nov. 12, 2010, 32 pages.
Australian Office Action dated Nov. 23, 2010 for AU Patent Application No. 2007293790, 2 pages.
China Office Action dated Nov. 10, 2010 for Application No. 200880000253.1, with English translation, 11 pages.
U.S. Office Action dated Oct. 29, 2010 for U.S. Appl. No. 12/346,644, 13 pages.
U.S. Office Action dated Dec. 10, 2010 for U.S. Appl. No. 12/281,633, 17 pages.
U.S. Office Action dated Dec. 12, 21, 2010 for U.S. Appl. No. 12/281,638, 21 pages.
UPnP; "Universal Plug and Play Device Architecture"; Jun. 8, 2000; Microsoft Corporation; Version 1.0; pp. 1-54.
WAP; "WAP Push Architectural Overview"; Jul. 3, 2001; WAP Forum; pp. 1-24.
U.S. Notice of Allowance dated Jan. 24, 2011 for U.S. Appl. No. 12/347,426, 5 pages.
U.S. Office Action dated Dec. 30, 2010 for U.S. Appl. No. 12/298,912, 11 pages.
Final Office Action for U.S. Appl. No. 12/298,912 dated Aug. 1, 2011, 14 pages.
Final Office Action for U.S. Appl. No. 12/281,648 dated Aug. 4, 2011, 18 pages.
Office Action issued Jul. 26, 2011 in Japanese Patent Application No. 2009-527301, including English translation, 4 pages.
Japanese Office Action dated Jun. 1, 2011 for application No. 2008-558198, 7 pages.
Non-final Office Action issued in U.S. Appl. No. 12/347,549 mailed Apr. 14, 2011, 14 pages.
Saxena et al., "Admission Control in Peer-to-Peer: Design and Performance Evaluation." 2003, ACM, SASN '03, pp. 1-11.
Japanese Office Action dated Jun. 1, 2011 for application No. 2009-537096, 5 pages.
Final Office Action dated Apr. 19, 2011 for U.S. Appl. No. 12/346,644, 10 pages.
Office Action issued in U.S. Appl. No. 12/346,668 mailed Apr. 5, 2011, 11 pages.
Office Action issued in U.S. Appl. No. 12/281,640 mailed Apr. 19, 2011, 9 pages.
Australian Office Action dated Apr. 21, 2011 for AU Patent Application No. 2007293790, 2 pages.
Japanese Office Action dated May 19, 2011 with English Translation, for application No. 2008-558196, 6 pages.
Chinese Office Action dated May 20, 2011 for Application No. 200780007181.9, with English translation, 7 pages.
Japanese Office Action dated May 19, 2011 with English Translation, for application No. 2008-558197, 4 pages.
Japanese Office Action dated May 25, 2011 with English Translation, for application No. 2008-558202, 7 pages.
U.S. Office Action dated Mar. 28, 2011 for U.S. Appl. No. 12/295,868, 13 pages.
US Non-Final Office Action dated Mar. 18, 2011 for U.S. Appl. No. 12/346,642, 14 pages.
US Final Office Action dated Mar. 23, 2011 for U.S. Appl. No. 12/346,487, 11 pages.
US Final Office Action dated Mar. 23, 2011 for U.S. Appl. No. 12/346,345, 12 pages.

(56) References Cited

OTHER PUBLICATIONS

US Notice of Allowance dated Mar. 31, 2011 for U.S. Appl. No. 12/347,426, 5 pages.
US Final Office Action dated Apr. 1, 2011 for U.S. Appl. No. 12/281,638, 24 pages.
U.S. Office Action dated Apr. 14, 2011 for U.S. Appl. No. 12/295,868, 13 pages.
Non-final Office Action for U.S. Appl. No. 12/281,647 dated Oct. 14, 2011, 12 pages.
Office Action issued Oct. 18, 2011 in Japanese Patent Application No. 2008-558196, including English translation, 7 pages.
Office Action issued Oct. 18, 2011 in Japanese Patent Application No. 2008-558198, including English translation, 7 pages.
Katsuyasu, Sotoyama, et al., "Techno College TCP/IP Protocol Lectyure," Nikkei Network, No. 67, Japan, Nikkei Business Publications, Inc., Oct. 21, 2005, with English Translation, pp. 120-125.
Notice of Allowance issued Nov. 15, 2011 in Japanese Patent Application No. 2008-558200, with English Translation, 6 pages.
Final Office Action for U.S. Appl. No. 12/347,549 dated Nov. 22, 2011, 12 pages.
Non-final Office Action for U.S. Appl. No. 12/281,633 dated Nov. 25, 2011, 18 pages.
Non-final Office Action for U.S. Appl. No. 12/295,868 dated Oct. 13, 2011, 14 pages.
Tsunoda, S., "The emergence of Ubiquitous Era, Overall JAVA technology supporting ubiquitous," JAVA Press, Japan, Jun. 18, 2005, vol. 42, p. 225.
Japanese Notice of Allowance dated Jun. 23, 2011 for application No. 2008-558201, with English translation, 6 pages.
Office Action issued Oct. 26, 2011 in Japanese Patent Application No. 2009-534512, including English translation, 5 pages.
European Office Action dated Aug. 23, 2011 for Appln. No. 08712540.7, 5 pages.
Final Office Action for U.S. Appl. No. 12/346,642 dated Sep. 15, 2011, 16 pages.

* cited by examiner

METHOD FOR MANAGING DOMAIN USING MULTI DOMAIN MANAGER AND DOMAIN SYSTEM

TECHNICAL FIELD

The present invention relates to a method of managing a domains and a domain system employing a multi-domain manager, and more particularly, to domain configuration and management technologies in which a domain system equipped with a plurality of domain managers can be configured and efficient domain management can be performed by employing a plurality of domain managers.

BACKGROUND ART

In general, DRM (Digital Rights Management) may refer to a comprehensive digital content protection technology which can prevent illegal reproduction and use of digital contents and allows only users who have a legitimate authority to use digital contents. DRM provides a comprehensive protection framework over the distribution of digital contents. For example, DRM converts digital contents into encrypted data of a pack type using encryption technologies so that corresponding contents can be used only through a lawful certification procedure.

This DRM has become a base of stable and legitimate content services while being associated with a variety of content service models. In reality, current content service providers adopt their unique DRMs in order to protect their servicing contents.

However, on one hand, DRM has several limits in order for users to use contents to which the DRM has been applied because the DRM has a very exclusive characteristic from technology and policy points of view. Users may recognize the limits as inconvenience.

Accordingly, systems, which can support a free use of contents while maintaining the security of DRM contents, have recently been proposed. A representative example is a domain system. The domain system employs the concept of a domain as the basis unit of a DRM trusted framework. The domain may refer to a collection of certificated devices or software systems. Certified devices registered with the domain can use DRM contents freely within an authorized range while sharing the contents.

The domain system can be configured by defining the functions of entities for configuring the domain and adequately associating the entities therewith on the basis of physical association environments of the entities. In particular, one of the most important factors in configuring the domain system lies in the configuration and operation of a domain management entity that manages a domain. Accordingly, there is an urgent need for a technology, which is able to efficiently configure and operate the domain management entity.

DISCLOSURE OF INVENTION

Technical Problem

A technical object to be solved by the present invention is to provide a method of managing a domain employing a multi-domain manager, which can designate a plurality of domain managers and manage a domain efficiently through the domain managers.

Another technical object to be solved by the present invention is to provide a domain system equipped with a plurality of domain managers and configured to perform domain management through the plurality of domain managers.

Technical Solution

To achieve one of the above objects of the present invention, in accordance with an aspect of the present invention, there is provided a method of managing a domain employing a multi-domain manager. The method of managing a domain employing the multi-domain manager includes the steps of designating a primary domain manager, configuring the domain by registering a domain device with the primary domain manager, designating at least one secondary domain manager of the domain devices, and managing the domain through conjunction of the primary domain manager and the secondary domain manager.

The step of designating the primary domain manager may include the steps of selecting a specific device, allowing the selected device to transmit a primary domain manager designation request to a service providing entity, and designating the device as the primary domain manager in response to a confirm message transmitted from the service providing entity. The primary domain manager designation request may include capability information of the device.

The step of designating the secondary domain manager may include the step of allowing the primary domain manager to designate a specific domain device, which is selected based on externally input information, as the secondary domain manager.

The step of designating the secondary domain manager may include the step of allowing the primary domain manager to collect specific information of a domain device from the domain device and designate the secondary domain manager on the basis of the gathered information.

In the step of managing the domain, the primary domain manager may operate in conjunction with the service providing entity, and the secondary domain manager may operate in conjunction with the service providing entity through the primary domain manager.

The secondary domain manager may be a plural number and assigns a priority to each of the plurality of secondary domain managers arbitrarily or according to specific criteria.

Meanwhile, to achieve the other of the above objects of the present invention, in accordance with an aspect of the present invention, there is provided a domain system. The domain system includes a primary domain manager for managing a domain, and at least one secondary domain manager which shares information of the domain, while operating in conjunction with the primary domain manager, and manages the domain under the control of the primary domain manager.

At least one of the primary domain manager and the secondary domain manager may manage a domain device of the domain or a temporary device, which is temporarily registered with the domain and provided with a service.

The primary domain manager may operate in conjunction with an external service providing entity, and the secondary domain manager may operate in conjunction with the service providing entity through the primary domain manager.

Advantageous Effects

As described above, in accordance with the present invention, a primary domain manager and at least one secondary domain manager are designated, and domain device management, temporary device management, and so on can be performed efficiently by employing the plurality of designated domain managers.

DESCRIPTION OF REFERENCE NUMERALS OF PRINCIPAL ELEMENTS IN THE DRAWINGS

PD: primary domain manager
SD: secondary domain manager
1: domain
10A, 10B: domain device
20: temporary domain device

MODE FOR THE INVENTION

Hereinafter, the present invention will be described in detail in connection with preferred embodiments with reference to the accompanying drawings in order for those skilled in the art to be able to implement the invention. In the preferred embodiments of the present invention, specific technical terminologies are used for clarity of the contents. However, It is to be understood that the present invention is not limited to specific selected terminologies and each specific terminology includes all technical synonyms operating in a similar way in order to accomplish similar objects.

A domain system in accordance with a preferred embodiment of the present invention can configure and operate a domain. Here, the domain is a basis unit of the DRM trusted framework and may refer to a range to which a domain system is substantially applied. The domain may include a collection of authorized devices. Domain devices included within the domain can share and use contents according to a permitted authority.

The domain can be configured by taking the physical locations of devices into consideration. That is, the domain is configured using devices existing within a specific physical region. In order to configure this domain, a local environment is necessary. Here, the local environment may refer to an environment, which is provided with a physical network where devices, belonging to a specific local region, can be operated in conjunction with one another and in which the physical network can operate in conjunction with an external network.

As an example that can provide this local environment, there can be a home network system. In general, the home network system enables home appliances, various sensors, security devices, etc. within a home to operate in conjunction with one another through a wired/wireless local network and also enables them to operate in conjunction with an external network, such as an Internet, through a communication node such as a home gateway. The local environment can be configured when not only this home network system, but also two or more network device, which can operate in conjunction with one another, exist.

It is assumed that a domain region, which is described later on, is a local region provided with the above local environment. A number of devices may exist within the domain region. A domain can be configured using devices within this domain region. Here, domain devices included in a domain can share and use contents according to a permitted authority. Meanwhile, devices outside a domain region, for instance, devices of an external region, which are accessed via an Internet, etc., can also be included in a domain in a remote state, if appropriate.

Figure 1:
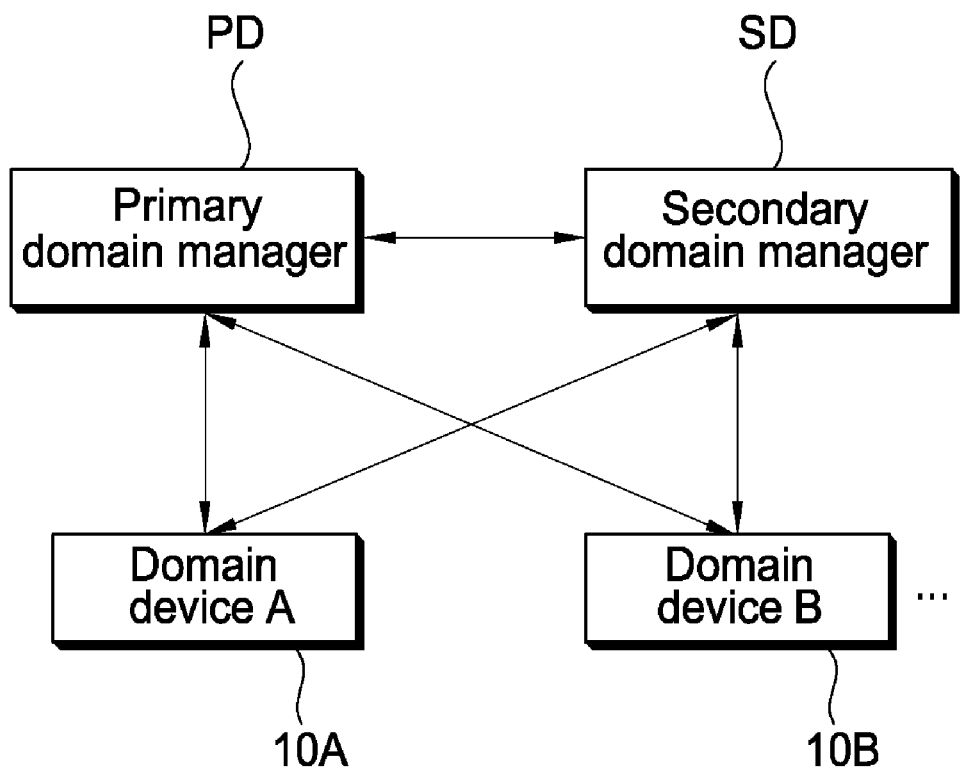
FIG. 1 is a block diagram showing basic constitutional entities of a domain system for constituting a domain in accordance with the present invention.

FIG. 1 is a block diagram showing basic constitutional entities of a domain system for constituting a domain in accordance with the present invention.

A domain system may include, as shown in FIG. 1, domain managers PD and SD. The domain managers PD and SD are entities that perform the function of managing a domain. For example, the domain managers PD and SD can perform functions such as creation of a domain, destruction of a domain, association of devices with a domain, removal of devices from a domain, discovery of domain devices, and domain device management.

The domain managers PD and SD can be classified into a primary domain manager PD and a secondary domain manager SD. Here, the primary domain manager PD may be one in number for the purpose of one domain, and the secondary domain manager SD may not be provided or may be one in number or a plural number.

The primary domain manager PD operates in conjunction with a service provider and performs major domain management. The primary domain manager PD may exist inside or outside a domain region. For example, the primary domain manager PD may be provided in a specific device within a domain region or a device of an external region and communicate with a service provider, or may be provided in a service provider.

The secondary domain manager SD helps domain management while operating in conjunction with the primary domain manager PD or performs domain management according to a command of the primary domain manager PD. Further, when an abnormal condition occurs in the primary domain manager PD, the secondary domain manager SD may replace the primary domain manager PD and therefore becomes a new primary domain manager.

This secondary domain manager SD preferably exists within a domain region. For example, the secondary domain manager SD may be provided in a specific device within a domain region. However, this is not a limiting factor and the secondary domain manager SD may also exist outside the domain region.

Figure 2:
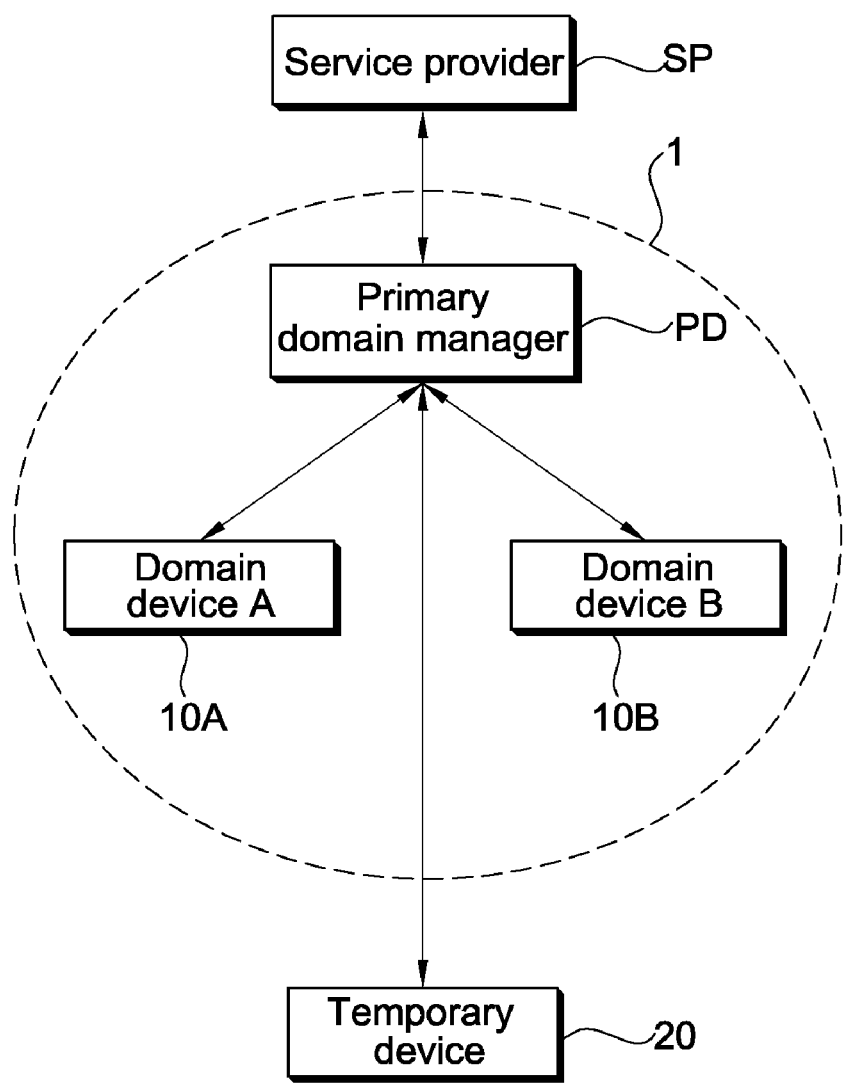
FIG. 2 is a block diagram showing the configuration of a domain system in accordance with a preferred embodiment of the present invention.

FIG. 2 is a block diagram showing the configuration of a domain system in accordance with a preferred embodiment of the present invention. This drawing shows an example in which the primary domain manager PD exists within a domain.

As shown in FIG. 2, the primary domain manager PD for managing the domain devices 10A and 10B is provided within the domain 1 and, therefore, one domain manager manages the domain. It is shown in FIG. 2 that the primary domain manager PD exists within a domain region and is included in the domain 1. However, the primary domain manager PD may exist in an external region, as mentioned earlier.

The primary domain manager PD can operate in conjunction with an external service provider SP and may be involved in registration, certification, termination, content sharing and the like of the domain devices 10A and 10B included in the domain 1, for instance, a domain deviceA 10A and a domain deviceB 10B. The service provider SP is an entity that operates a service and can become, for example, a source for contents supplied to a domain. A user can purchase contents and the authority of contents by paying for right expenses or through a corresponding measure.

Further, the primary domain manager PD can function to register a temporary device 20, which is desired to be temporarily registered with the domain 1, with the domain 1, manage the registered temporary device 20, and provide limited domain services to the temporary device 20. Here, the temporary device 20 may refer to a domain device, which is temporarily registered with the domain 1 and provided with limited domain services. For example, if a userA wants a device of a userB, that is, another user to be temporarily registered with a domainA in which his home is configured as a domain region and wants to share contents with the userB, the device of the userB may be called as a temporary device. The temporary device 20 may be a device included in another domain or a device that is not included in any domain.

Figure 3:
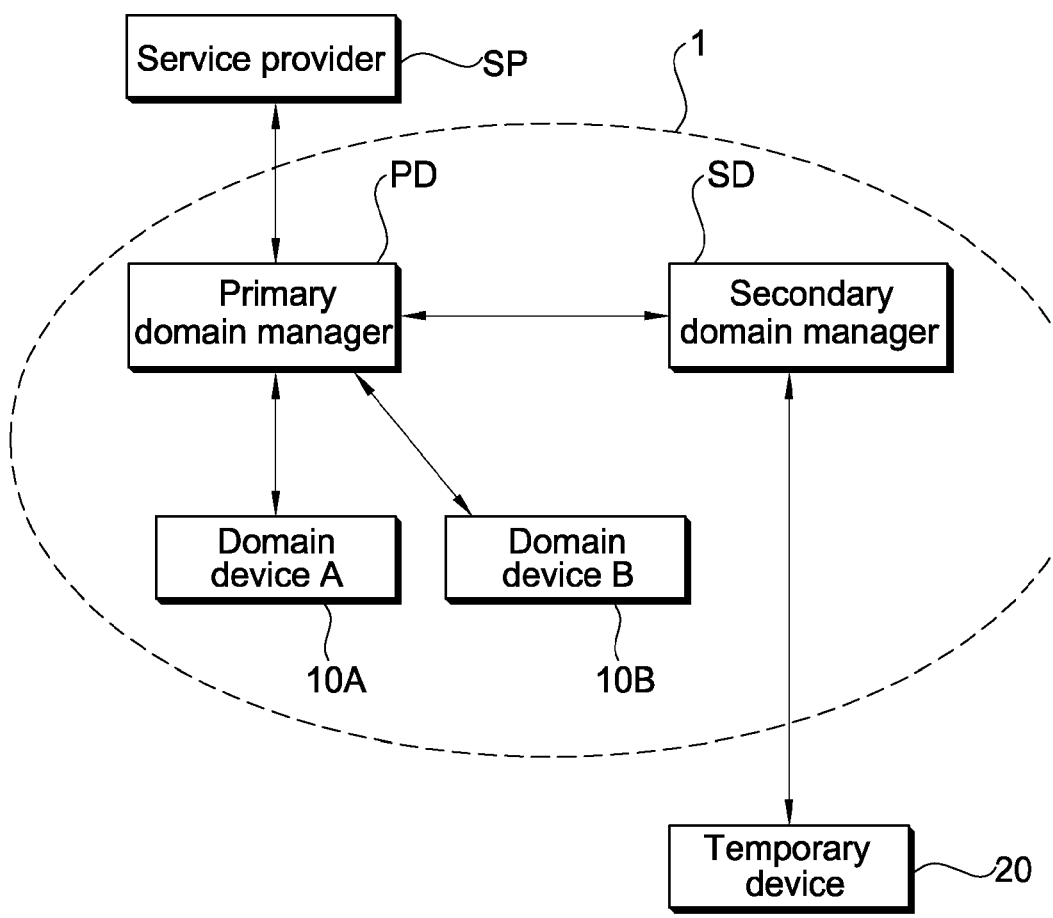
FIG. 3 is a block diagram showing the configuration of a domain system in accordance with another preferred embodiment of the present invention.

FIG. 3 is a block diagram showing the configuration of a domain system in accordance with another preferred embodiment of the present invention. This drawing shows an example in which the primary domain manager PD and the secondary domain manager SD exist within the domain 1.

The primary domain manager PD and the secondary domain manager SD are provided within the domain 1, as shown in FIG. 3. Here, the primary domain manager PD operates in conjunction with an external service provider SP and manages the domain devices 10A and 10B.

The secondary domain manager SD shares device information, domain service information, and so on with the primary domain manager PD while operating in conjunction with the primary domain manager PD. Here, the device information may include a unique ID of a domain device, etc. and the domain service information may include information per on an item basis, authority information, etc. of a service related to a domain. The secondary domain manager SD need not to perform consistent communication with the service provider SP, but can exchange information with the service provider SP while indirectly operating in conjunction with the service provider SP through the primary domain manager PD.

Further, the secondary domain manager SD can function to provide limited domain services by managing a part of the domain management function, for instance, a temporary device 20. That is, the primary domain manager PD is responsible for the management of the domain devices 10A and 10B, which is a major part of domain management, and the secondary domain manager SD is responsible for the management of the temporary device 20.

Meanwhile, the primary domain manager PD and the secondary domain manager SD continuously communicate with each other in order to share information and determine whether an abnormality has occurred. Here, if an abnormality has occurred in the primary domain manager PD, the secondary domain manager SD may replace the primary domain manager PD.

Figure 4:
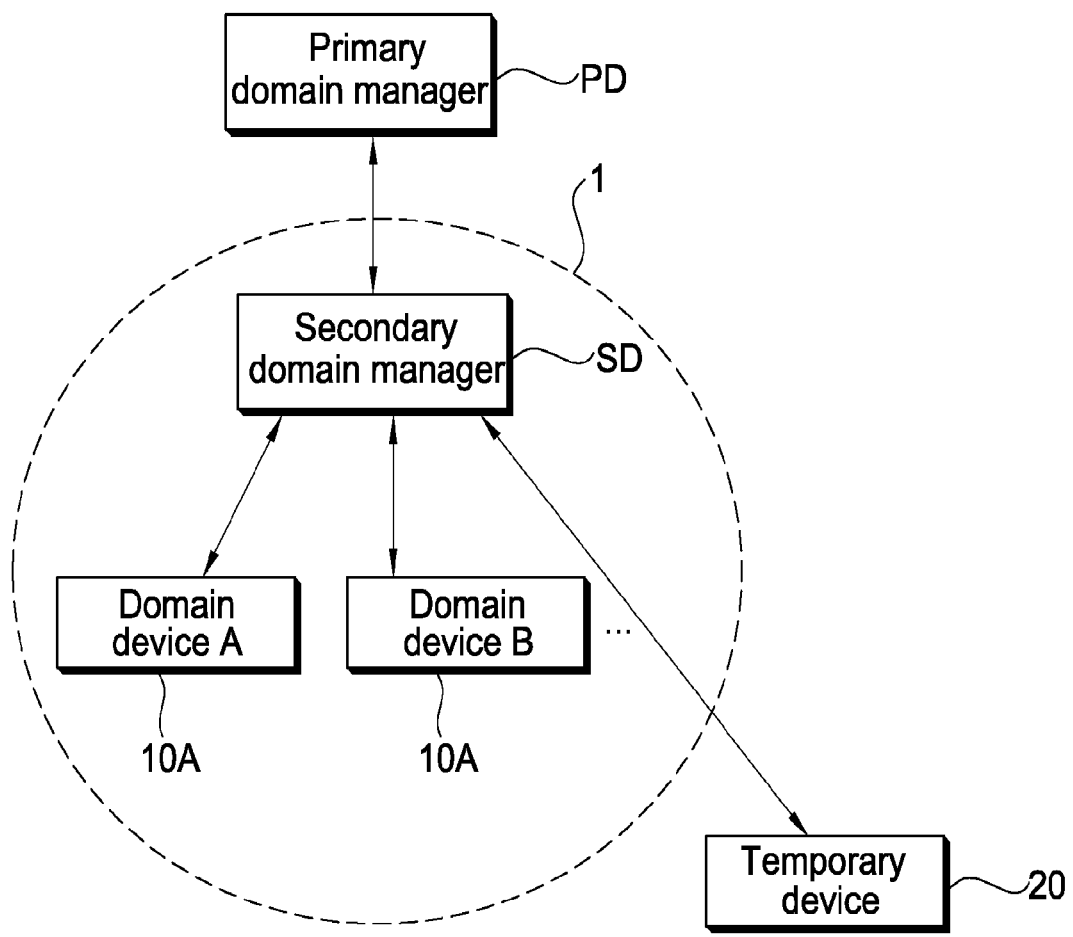
FIG. 4 is a block diagram showing the configuration of a domain system in accordance with still another preferred embodiment of the present invention.

FIG. 4 is a block diagram showing the configuration of a domain system in accordance with still another preferred embodiment of the present invention. This drawing shows an example in which the primary domain manager PD exists outside and the secondary domain manager SD exists within the domain 1.

As shown in FIG. 4, the primary domain manager PD operates in conjunction with the secondary domain manager SD existing within the domain 1. Here, the primary domain manager PD may communicate with a service provider in an external region or may be provided within a service provider. For example, the primary domain manager PD may be implemented in the form of a web service.

The secondary domain manager SD is included within the domain 1 and performs domain management under the control of the primary domain manager PD within the domain 1. In other words, the primary domain manager PD existing outside the domain 1 controls the secondary domain manager SD, and the secondary domain manager SD, which is provided in a specific device belonging to the domain region, performs substantial domain management, for instance, management, etc. of the domain devices 10A and 10B and the temporary device 20.

In the above description, the embodiments in which domain management is carried out by employing the primary domain manager PD and the secondary domain manager SD have been described.

Meanwhile, a method of allowing a domain manager (a primary domain manager or a secondary domain manager) to detect a domain device includes a detection method initiated by a domain manager and a detection method initiated by a user.

The detection method by the domain manager may refer to a method of allowing the domain manager to browse and detect a device. The detection method by the domain manager can be applied to an environment in which, when a domain device being provided with a domain service or a device or temporary device that is to receive a domain service is connected to a network, the domain manager recognizes such connection and browses the device. For example, the detection method by the domain manager may be easily applied to a case where the domain manager exists in a specific device of a domain region.

In contrast, the detection method initiated by a user may refer to a method of detecting a corresponding device in response to a user's initiation for the purpose of a domain service of a specific device. For example, if a user requests a domain service with respect to a specific device, for instance, a device or temporary device that wants to receive the domain service, the device requests a domain manager to detect the device and the domain manager detects the device in response thereto. The detection method initiated by a user can be conveniently applied to a case where a domain manager exists in an external region or a device cannot be browsed.

Figure 5:
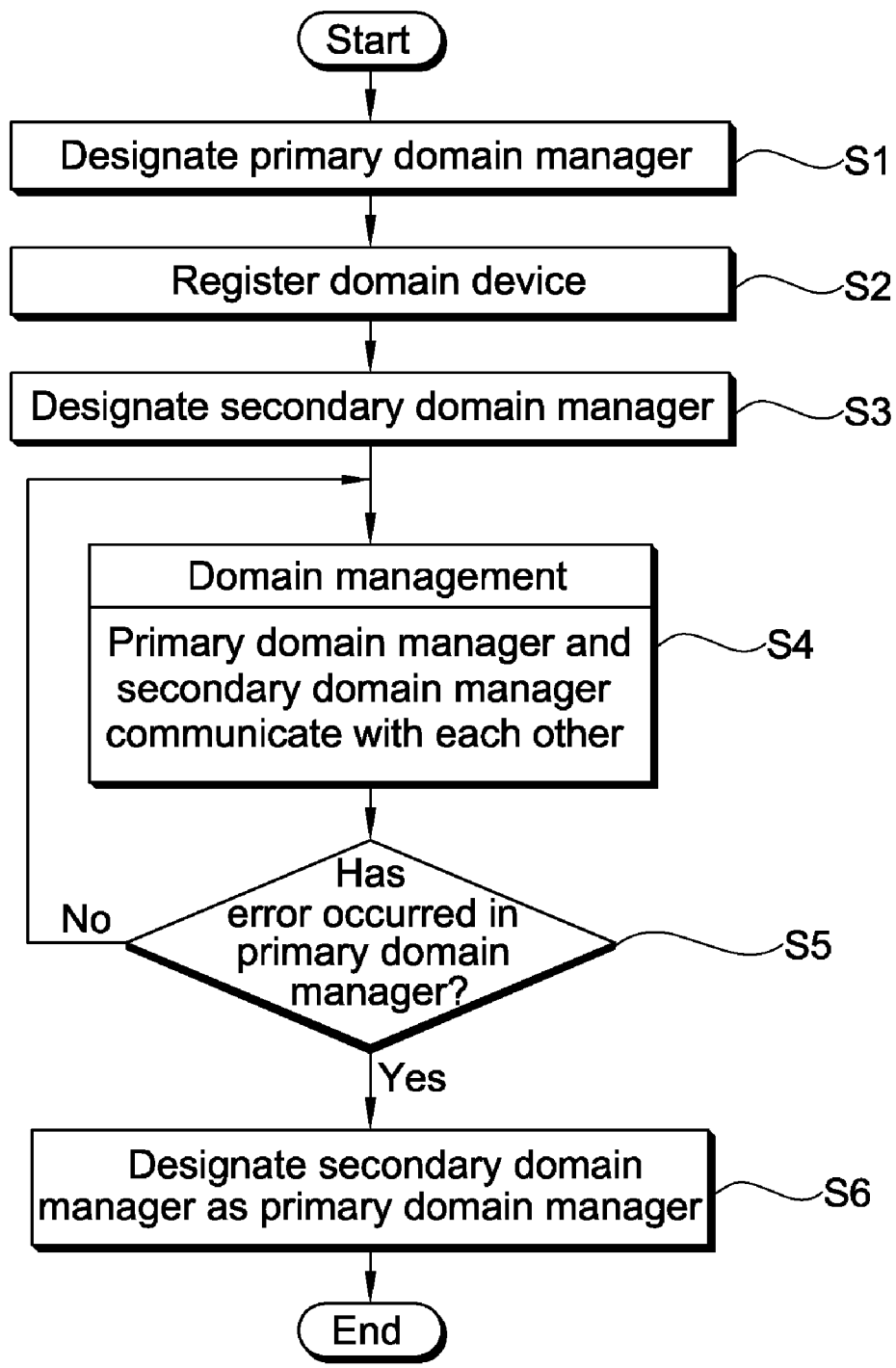
FIG. 5 is a flowchart illustrating a procedure of configuring and managing domains by operating a plurality of domain managers.

FIG. 5 is a flowchart illustrating a procedure of configuring and managing domains by operating a plurality of domain managers.

Referring to FIG. 5, a domain system first designates a primary domain manager in order to start a domain service (step: S1). Here, the primary domain manager may exist within a domain region. In this case, the designation procedure of the primary domain manager is described below.

A specific device to be used as a primary domain manager, of devices within a domain region, is designated by the input of a user or through information exchange between devices. For example, a user can select a device in order to use a specific device within a domain region as a primary domain manager and input request information, or a device having a better capability, of devices connected to a local network, can be selected through exchange of capability information.

The capability is information in which device performance is quantified according to specific criteria so that they can be compared with one another. The capability can include hardware performance, network performance, security performance, battery capability and the like.

A selected device transmits a primary domain manager designation request to a service provider. The primary domain manager designation request can include device information (for example, capability information, DRM information, etc.). The service provider determines whether the selected device can be specified as a primary domain manager in response to the primary domain manager designation request, and if it is determined that the selected device can be specified as a primary domain manager, transmits a confirm message. Hence, the selected device is designated as a primary domain manager.

Meanwhile, the primary domain manager may exist outside the domain region. In this case, the service provider itself can designate a primary domain manager.

After the primary domain manager is designated, the primary domain manager configures a domain by registering a domain device (step: S2). For example, the primary domain manager may detect devices within a domain region, request the devices to be certificated, and then register a domain device, or devices of a domain region may request registration from the primary domain manager, or a user may request the primary domain manager to register a domain device.

Thereafter, the domain system designates a secondary domain manager of the domain services included in the domain (step: S3). Here, the secondary domain manager may be a domain device, which is input by a user or selected by a domain manager, or a device selected through information exchange between domain devices. For example, the domain manager may designate a specific domain device, which is input by a user, as a secondary domain manager, or designate a device having a better capability as a secondary domain manager by gathering specific information (for instance, capability information) of domain devices. As an alternative method, domain devices may exchange specific information (for instance, capability information), and a domain device having a better capability than that of other domain devices may request registration with a secondary domain manager from a domain manager and be thus designated as the secondary domain manager. The thus designated secondary domain manager can be registered with the primary domain manager.

Meanwhile, the number of the secondary domain manager may be plural. Each of the plurality of secondary domain managers may have a priority. The priority may be assigned arbitrarily by a user or a domain manager, or may be assigned in order of a better domain capability.

If the secondary domain manager is designated, the primary domain manager and the secondary domain manager perform domain management while sharing information of domain devices, content information, service information and the like through communication (step: S4). The primary domain manager can update information about a service provider at regular intervals while communicating with the secondary domain manager. The method of managing a domain by employing the primary domain manager and the secondary domain manager has described above with reference to FIGS. 3 and 4.

Meanwhile, if an abnormity occurs in the primary domain manager (step: S5), the secondary domain manager cannot receive a signal from the primary domain manager. In this case, the secondary domain manager can be designated as a new primary domain manager instead of the primary domain manager (step: S6). For example, if a signal is not received from the primary domain manager for a specific period of time, the secondary domain manager can inform a service provider of this fact, request itself to be registered as a new primary domain manager, and serve as the primary domain manager if a confirm message is received.

The number of the secondary domain manager may be plural. In this case, the secondary domain manager may substitute the primary domain manager arbitrarily or according to a priority assigned to each secondary domain manager. For example, if an abnormality occurs in the primary domain manager, a secondary domain manager having the highest priority may become a new primary domain manager. If an abnormality occurs in the new primary domain manager, a secondary domain manager having the second highest priority may become a primary domain manager. Meanwhile, if an abnormality occurs in the secondary domain manager, the primary domain manager may designate a new secondary domain manager according to the above procedure of designating the secondary domain manager, or designate a new secondary domain manager arbitrarily or according to a priority when a plurality of secondary domain managers are designated.

Figure 6:
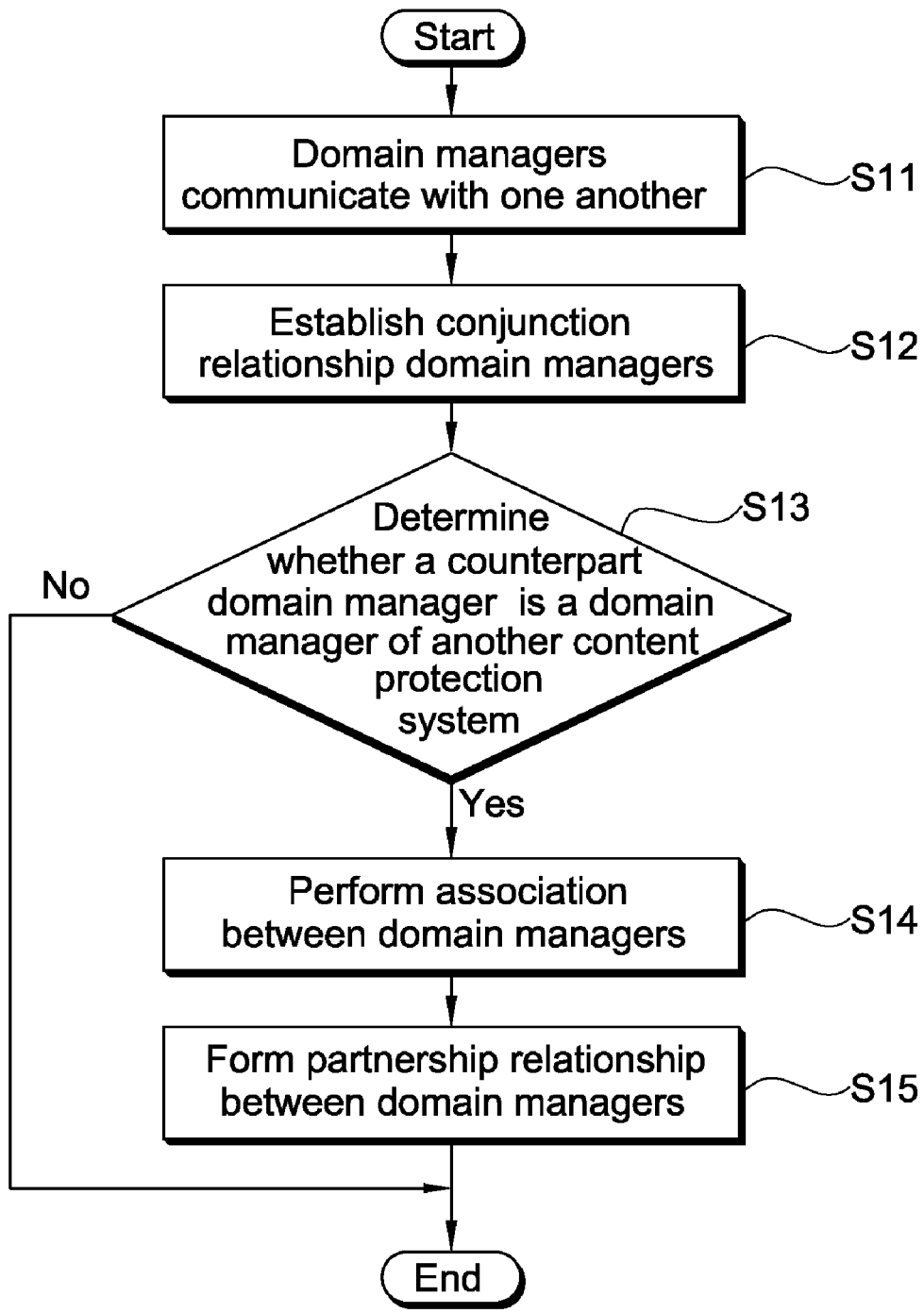
FIG. 6 is a block diagram illustrating a procedure of enabling different domain managers to operate in conjunction therewith.

FIG. 6 is a block diagram illustrating a procedure of enabling different domain managers to operate in conjunction therewith. Here, the conjunction between different domain managers may be conjunction between domain managers of different content protection systems or conjunction between domain managers of the same content protection system.

Referring to FIG. 6, different domain managers communicate with one another (step: S11) and a conjunction relationship is established between two different domain managers (step: S12). Here, the conjunction relationship may refer to a relationship in which basic service information pertinent to a domain service, such as information of domain devices of a domain, domain service information, and content information, can be shared.

After the conjunction relationship is established, the two domain managers determine whether a counterpart domain manager having a conjunction relationship with itself is a domain manager of another content protection system (step: S13). If it is determined that the counterpart domain manager is a domain manager of another content protection system, association is performed between the domain manager and the counterpart domain manager (step: S14). Here, the association may refer to a process of analyzing a domain service authority of each domain manager. If this association is carried out, a partnership relationship can be formed between the two domain managers (step: S15). The partnership relationship may refer to a relationship in which different content protection systems can be compatible with each other. In the partnership relationship, a new domain service authority according to an agreement in two content protection systems can be defined.

Meanwhile, a multi-input single-output device may exist in a domain device included in a domain. The multi-input single-output device may refer to a device which receives a plurality of contents and outputs them as a complex content. Hereinafter, a procedure of processing contents and a license of this multi-input single-output device is described.

Figure 7:
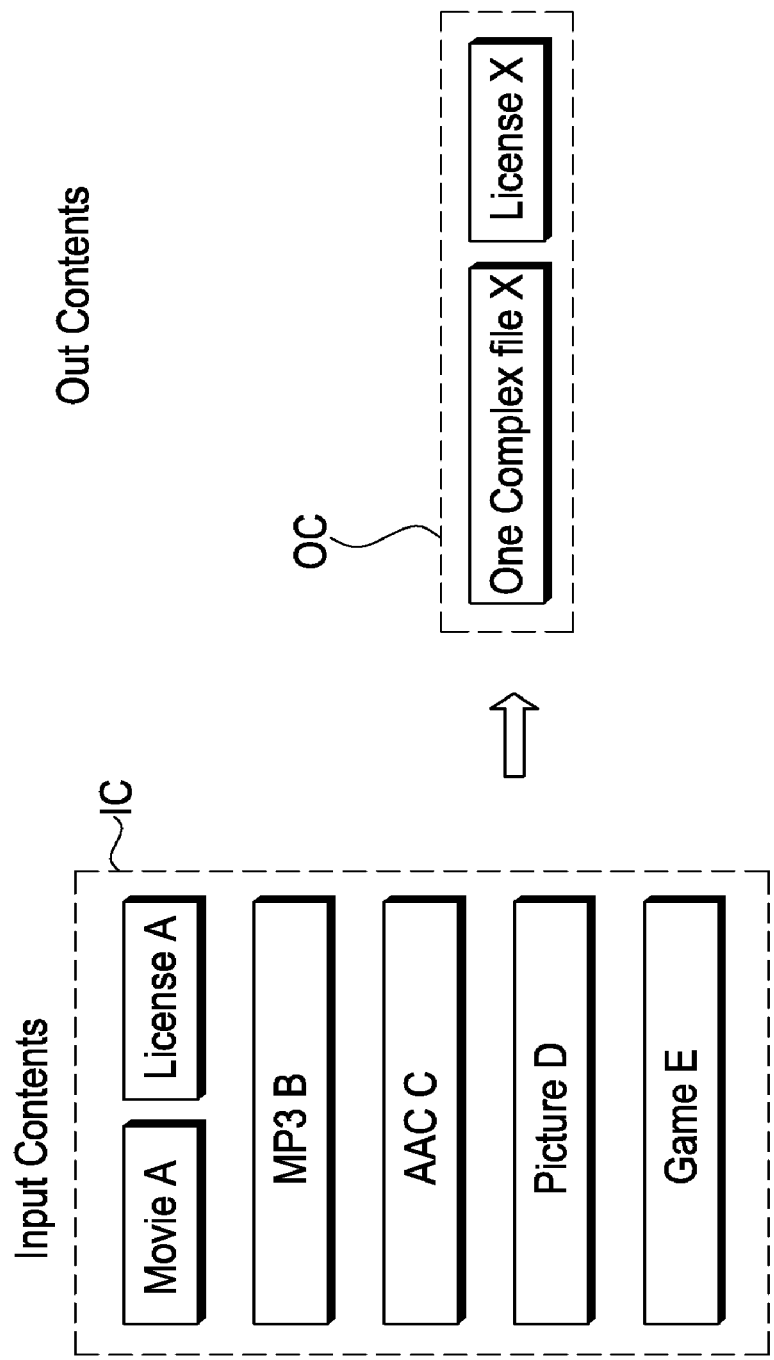
FIG. 7 is an exemplary view showing input content and output content of a multi-input single-output device.

FIG. 7 is an exemplary view showing input content and output content of the multi-input single-output device.

As shown in FIG. 7, the multi-input single-output device can receive input data IC including various kinds of contents. For example, the multi-input single-output device can receive contents including a motion image content "Movie A", a sound source "MP3 B", "AAC C", an image "Picture D", a game "Game E", and so on. Here, the motion image content "Movie A" is applied a content protection system and associated with a license "License A". That is, the motion image content "Movie A" is available with a range defined by the license "License A".

The multi-input single-output device integrates the plurality of input contents IC to thereby generate a complex file, generates a license defining an authority on which the complex file can be used, and outputs an output content OC. For example, the multi-input single-output device can output "one complex AV file X" (that is, a complex file) and "License X" (that is, a license) for using the one complex AV file X.

Figure 8:
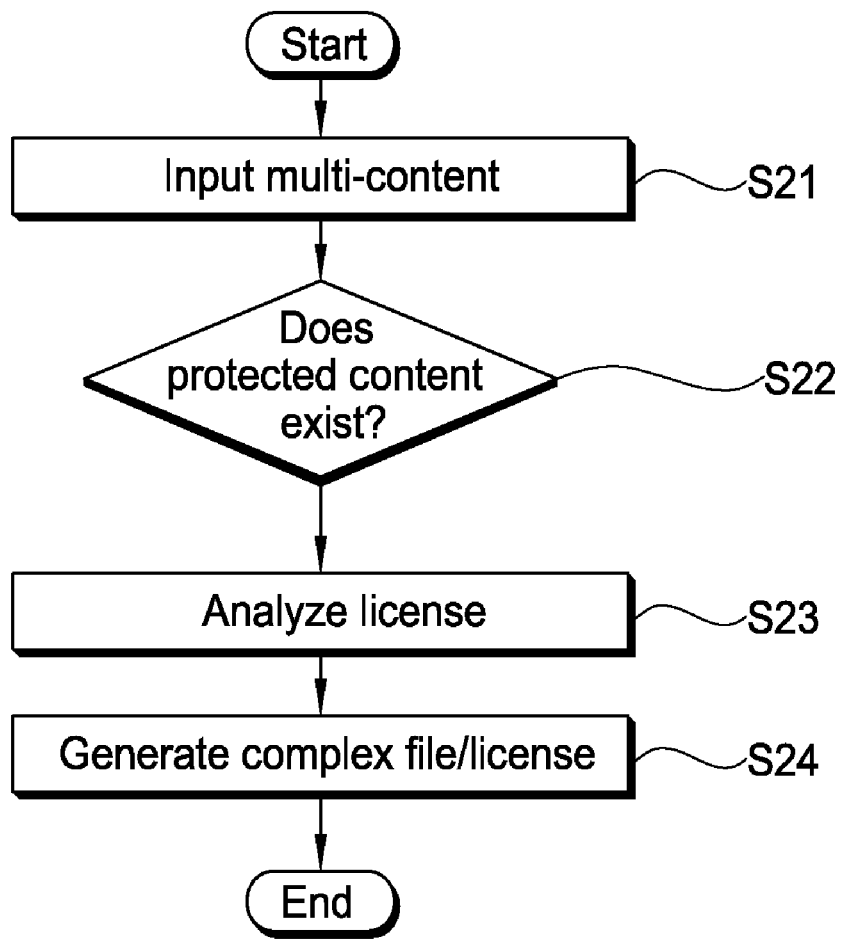
FIG. 8 is a flowchart illustrating a multi-input single-output processing procedure of a domain device.

FIG. 8 is a flowchart illustrating a multi-input single-output processing procedure of a domain device.

As shown in FIG. 8, a domain device receives a plurality of contents (step: S21) and determines whether contents to which a content protection system has been applied exist in the input contents (step: S22). The contents to which the content protection system has been applied may include DRM contents, scrambled contents, and so on.

If, as a result of the determination, there exist contents to which the content protection system has been applied, the domain device receives and analyzes a license in which an authority on which the contents having the content protection system applied thereto can be used is defined (step: S23). The license may include a time, a play number, an available copy number, a movable number, etc. of pertinent contents.

Thereafter, the domain device integrates the plurality of contents to thereby generate a complex content and generates a license on which the complex content can be used (step: S24).

Here, the domain device may integrate the input contents so that they have an association relationship with the complex content or integrate the input contents in a packaging form. For example, when a specific motion image, and a sound source, texts, broadcasting images, etc., which will be played additionally when playing the motion image are input, the domain device may integrate the specific motion image, and the sound source, texts, broadcasting images, etc. to thereby generate an integrated play content, or generate a packaging file in which the plurality of input contents can be integrally managed.

Meanwhile, in the case of a license for using a complex content, a new license can be issued in consideration of license contents of analyzed and input contents, a policy and C&R (Compliance and Robustness Rule) of a domain service and the like. For example, a new license may be issued by using a license of any one of specific input contents without change or through trading according to licenses of input contents.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for managing a domain, performed by a first device, the method comprising:
   designating the first device as a primary domain manager that implements domain management functionalities;
   configuring a domain by registering one or more domain devices based on at least one of a first mode initiated by the primary domain manager and a second mode initiated by a user input,
   wherein, in the first mode, the primary domain manager detects the one or more devices within a domain area, requests the one or more devices to be certified and registers the one or more devices based on certification of the one or more devices, and
   wherein in the second mode, the primary domain manager receives a registration request from a device that has received the user input, and detects the device that has received the user input signal;
   checking a capability of each device associated with the configured domain;
   wherein the capability includes at least one of hardware performance, network performance, security performance, and battery capability;
   designating second devices associated with the domain as secondary domain managers based on checking the capability of each device associated with the domain, wherein each of the secondary domain managers has a priority that is assigned in order of a higher capability, and a first secondary domain manager that has the highest priority among the secondary domain managers replaces the primary domain manger when the primary domain manager is in a failure state;
   splitting the domain management functionalities by transferring at least one of the domain management functionalities, which includes management of a temporary device that is temporarily registered with the domain and is provided limited domain service based on a predetermined criterion, from the primary domain manager to at least one of the secondary domain managers; and
   managing the domain using the domain management functionalities provided by the designated primary domain manager and at least one of the secondary domain managers.

2. The method of claim 1, wherein the domain management functionalities further comprise:
   authorizing joining and leaving of the domain,
   wherein the primary domain manager is responsible for the management of a normal domain device and at least one of the secondary domain managers is responsible for the management of the temporary device,
   wherein at least one of the normal domain device and the temporary device is multiple-input-single-output device which generates a complex file by integrating a plurality of input content, generates a license of the generated complex file and outputs the generated complex file and license.

3. The method of claim 1, wherein the primary domain manager communicates with a server in an external region or is within the server, and each of the secondary domain managers is included within the domain and performs domain management under a control of the primary domain manager.

4. The method of claim 1, further comprising:
   transmitting, to at least one of the secondary domain managers, a signal indicating a status of the primary domain manager; and
   receiving, from at least one of the secondary domain managers, a signal indicating a status of at least one of the secondary domain managers.

5. The method of claim 1, wherein the first device is elected as the device having the highest capability by comparing, amongst devices, a capability of the devices, and
   wherein designating the first device as the primary domain manager comprises:
   transmitting a primary domain manager designation request to a server, the primary domain manager designation request including capability information of the first device and digital rights management (DRM) information of the first device, and receiving, from the server, a response indicating that the first device is designated as the primary domain manager, wherein the server determines, in response to the primary domain manager designation request, whether the elected first device can be designated as the primary domain manager, and upon determining that the elected first device can be specified as the primary domain manager, transmits the response to the first device.

6. A system for managing a domain, the system comprising: second devices associated with the domain; and a first device for:

designating the first device as a primary domain manager that implements domain management functionalities;

configuring a domain by registering one or more domain devices based on at least one of a first mode initiated by the primary domain manager and a second mode initiated by a user input, wherein, in the first mode, the primary domain manager detects the one or more devices within a domain area, requests the one or more devices to be certified and registers the one or more devices based on certification of the one or more devices, and wherein in the second mode, the primary domain manager receives a registration request from a device that has received the user input, and detects the device that has received the user input signal;

checking a capability of each device associated with the configured domain;

wherein the capability includes at least one of hardware performance, network performance, security performance, and battery capability;

designating the second devices associated with the domain as secondary domain managers based on checking the capability of each device associated with the domain, wherein each of the secondary domain managers has a priority that is assigned in order of a higher capability, and a first secondary domain manager that has the highest priority among the secondary domain managers replaces the primary domain manger when the primary domain manager is in a failure state;

splitting the domain management functionalities by transferring at least one of the domain management functionalities, which includes management of a temporary device which is temporarily registered with the domain and is provided limited domain service based on a predetermined criterion, from the primary domain manager to at least one of the secondary domain managers; and managing the domain using the domain management functionalities provided by the designated primary domain manager and at least one of the secondary domain managers.

7. The system of claim 6, wherein the domain management functionalities further comprise:

authorizing joining and leaving of the domain, wherein the primary domain manager is responsible for the management of a normal domain device and at least one of the secondary domain managers is responsible for the management of the temporary device wherein at least one of the normal domain device and the temporary device is multiple input single output device which generates a complex file by integrating a plurality of input content, generates a license of the generated complex file and outputs the generated complex file and license.

8. The system of claim 6, wherein the primary domain manager communicates with a server in an external region or is within the server, and each of the secondary domain managers is included within the domain and performs domain management under a control of the primary domain manager.

9. The system of claim 6, wherein the primary domain manager transmits, to at least one of the secondary domain managers, a signal indicating a status of the primary domain manager; and receives, from at least one of the secondary domain managers, a signal indicating a status of at least one of the secondary domain managers.

10. The system of claim 6, wherein the first device is elected as the device having the highest capability by comparing, amongst devices, a capability of the devices, and wherein designating the first device as the primary domain manager comprises:

transmitting a primary domain manager designation request to a server, the primary domain manager designation request including capability information of the first device and digital rights management (DRM) information of the first device, and receiving, from the server, a response indicating that the first device is designated as the primary domain manager, wherein the server determines, in response to the primary domain manager designation request, whether the elected first device can be designated as the primary domain manager, and upon determining that the elected first device can be specified as the primary domain manager, transmits the response to the first device.

* * * * *